United States Patent Office 3,405,178
Patented Oct. 8, 1968

3,405,178
PROCESS FOR THE SINGLE STAGE MANUFACTURE OF METHYL ISOBUTYL KETONE
Johannes Wöllner, Kapellen Kreis Moers, and Friedrich Engelhardt, Homberg (Lower Rhine), Germany, assignors to Rheinpreussen Aktiengesellschaft für Bergbau und Chemie, Homberg (Lower Rhine), Germany, a corporation of Germany
No Drawing. Filed Mar. 2, 1964, Ser. No. 348,883
Claims priority, application Germany, June 29, 1963, R 35,549
21 Claims. (Cl. 260—593)

ABSTRACT OF THE DISCLOSURE

Single stage process for producing methyl isobutyl ketone from acetone by liquid phase contact of acetone with hydrogen in the simultaneous presence of an acid cation exchange resin and a hydrogenation catalyst, e.g., palladium on carbon, optionally using a fixed bed or suspension catalyst system and concomitantly a batch or continuous technique, e.g., at temperatures between about 50–200° C. and pressures between about 1–50 atmospheres absolute, with a hydrogen partial pressure between about 1.1–25 atmospheres absolute.

---

The present invention relates to a process for the single stage manufacture of methyl isobutyl ketone, and more particularly to the production of methyl isobutyl ketone by contacting acetone in liquid phase with hydrogen in the presence of an acid cation exchanger and a hydrogenation catalyst.

Various methods are known for the manufacture of methyl isobutyl ketone wherein both liquid phase and vapor phase operations may be utilized. Most of the processes heretofore known for producing methyl isobutyl ketone have been multistage processes.

In one three-stage process for the manufacture of methyl isobutyl ketone, acetone is first made to react in the presence of basic condensation agents to form diacetone alcohol, which is then dehydrated to mesityl oxide. In an additional stage, the selective hydrogenation of the mesityl oxide takes place to form the methyl isobutyl ketone.

In a two-stage process for the manufacture of methyl isobutyl ketone, acetone is made to react in liquid phase, by means of a strongly acid cation exchange resin, directly to form mesityl oxide, which is then separately hydrogenated to methyl isobutyl ketone in a second stage.

It is furthermore within the prior art to produce methyl isobutyl ketone by a two-stage vapor phase method in which acetone vapor is passed over a solid catalyst such as lead acetate, resulting in the formation of mesityl oxide. The subsequent hydrogenation by means of a selectively operating catalyst leads to the desired methyl isobutyl ketone.

In German Patent 1,063,592 a process is disclosed which leads in a single process stage from isopropyl alcohol to mixtures of methyl isobutyl ketone and diisobutyl ketone. This is a vapor-phase process in which the combined formation of methyl isobutyl ketone and diisobutyl ketone takes place over a mixed catalyst of copper oxide, magnesium oxide and pumice powder. Disadvantages of this process include a very low space-time yield amounting, according to the patent, to approximately 30 grams of methyl isobutyl ketone per liter of catalyst volume per hour.

The other processes mentioned above all require a relatively long operating time and relatively high apparatus expense. Furthermore, the space-time yield is slight or low, especially in the above-noted vapor-phase processes. Also, they result in a considerable production of by-products.

It is an object of the present invention to overcome the foregoing drawback and to provide a convenient, inexpensive, and versatile process for the single-stage production of methyl isobutyl ketone leading to good space-time yields.

It is another object of the present invention to provide a process of the foregoing type utilizing a catalyst material under process conditions at which no gumming up or poisoning of the active catalyst surface takes place.

It is still another object of the present invention to provide a process of the foregoing type in which methyl isobutyl ketone is directly produced without appreciable formation of byproducts in spite of the use of a multiple component system for carrying out the reaction.

It is another object of the present invention to provide a process of the foregoing type in which the various reaction steps take place simultaneously with the acetone being in liquid phase.

It is another object of the present invention to provide such a process as hereinabove described utilizing, simultaneously with a hydrogenation catalyst capable of selectively hydrogenating olefinic double bonds, a cation exchange component.

It is a further object of the present invention to provide a process which may be carried out either batchwise or continuously, preferably with agitation of the cation exchange component and the catalyst in the liquid phase of the reaction mixture.

It is a particular object of the present invention to utilize a strongly acid cation exchange resin as the cation exchange component which possesses good temperature resistance.

It is another object of the present invention to provide a process of the foregoing type in which a low hydrogen partial pressure, relative to the total pressure of the system, is employed to inhibit the formation of isopropyl-alcohol by the undesired hydrogenation of the acetone.

Other and further objects of the present invention will become apparent from a study of the within specification and accompanying examples.

It has been found in accordance with the present invention that a versatile single stage process for the production of methyl isobutyl ketone may be provided which comprises contacting acetone in liquid phase with hydrogen in the presence of an acid cation exchanger and an olefinic double bond selectively hydrogenating catalyst at elevated temperature, whereupon the methyl isobutyl ketone-containing reaction mixture may be recovered, and in turn the methyl isobutyl ketone itself as desired. The methyl isobutyl ketone is recovered preferably from the reaction mixture by distillation, and usually this takes place after the reaction mixture has been separated from the acid cation exchanger and the hydrogenation catalyst.

It will be appreciated that the instant process may be carried out batchwise or continuously. The solid or fixed bed embodiment or the suspension method with respect to the exchange resin can be used for the continuous process advantageously. For batch operation, it is preferable to use the suspension method. The process is usually effected at a temperature between about 50–200° C. Elevated pressure may also be employed, such as a pressure between about 1–50 atmospheres absolute, with the partial pressure of the hydrogen present preferably ranging between about 1.1–25 atmospheres absolute.

The hydrogenation catalyst is significantly an olefinic bond-selectively hydrogenating catalyst such as metal selected from the group consisting of palladium, platinum, ruthenium, Raney nickel, and Raney copper. The catalyst may be situated in divided form on a carrier support such as a carrier support selected from the group consisting of activated carbon, activated aluminum oxide, kieselguhr and pumice.

In this connection, the cation exchanger is significantly a resin containing acid group and is generally selected from the group consisting of copolymers of monofunctional polymerizable compounds, and difunctional or polyfunctional polymerizable compounds having more than two functional groups, phenolic condensation resins which are obtained from phenols and/or their substitution products and aldehydes and/or ketones.

The advantages of the present invention are surprising in many ways, and could not be foreseen, since there was no way to predict that no mutual inactivation would occur in the simultaneous presence of the two different activating components or catalysts including specifically the hydrogenation catalyst selectively acting on C=C double bonds and an acid cation exchange substance in admixture.

Also the fact that no objectionable resin formation occurs in the process of the invention, and hence no gumming up of the surfaces of the catalysts, is all the more surprising inasmuch as, according to experience, and by way of comparison, when mesityl oxide is formed from acetone over an acid cation exchange substance in the absence of hydrogen and of a selectively working hydrogenation catalyst, there develops a considerable amount of the more highly condensed byproducts—the so-called "acetone oil" and tarry byproducts—which settle in part on the surface of the catalyst. More surprising than anything else, however, is the possibility of now attaining the direct production of methyl isobutyl ketone without appreciable formation of byproducts, which is quite unusual when it is considered that such a multiple-component system is present, as well as a plurality of reaction steps which take place simultaneously.

The quantity and distribution of the cation exchange component in the system is extraordinarily important as a factor governing the speed of the reaction. In addition to an optimum quantity of the cation exchange material corresponding to the prevailing conditions, another important factor especially in batch operation is the fineness of the grain, so as to have an optimum distribution in the reaction chamber through agitation.

Resins on a polymerization or condensation basis, containing sulfonic acid groups and/or carboxylic acid groups, phosphonic acid groups or arsonic acid groups, are generally suitable. Cation exchangers on a polymerization basis include copolymers of monofunctional polymerizable compounds, such as styrene, o-, m- and p-methyl and -ethylstyrene, vinyl naphthalene, acrylic acid or methacrylic acid, and difunctional or polyfunctional compounds, such as divinyl benzenes, divinyl sulfone, ethylene dimethacrylate, divinyl ketone, vinyl maleate, vinyl esters of acrylic acid, methacrylic acid, ethacrylic acid, divinyl esters of dibasic acids such as oxalic acid, maleic acid, etc. Suitable condensation type cation exchangers, on the other hand, include phenolic resins which are obtained from phenols and/or their substitution products and aldehydes and/or ketones. The manufacture of the cation exchange resins, which does not form an object of the present application, has been described in U.S. Patents Nos. 2,597,- 438, 2,500,149 and 2,366,007 and the German Patents Nos. 960,858, 965,166, 1,031,513, 1,057,338, 755,119, 734,279, 749,553, 733,679, 747,644, 871,964, 914,186 and 919,666. The cation exchange resins are commercially available in the form of their alkali salts. These products can be converted to the acid form by treating the resin with a mineral acid, such as hydrochloric acid, and subsequently removing the excess mineral acid and the inorganic salt by washing with water.

It has proven particularly advantageous furthermore to use for the process of the invention strongly acid cation exchangers having good temperature resistance. Such temperature-resistant cation exchangers include polystyrene-divinyl benzene resins containing sulfonic acid groups, such as Dowex 50W–X8 of the Dow Chemical Company, Midland, Mich., U.S.A.; Amberlite IR–112 and 120 of the Rohm & Haas Company, Philadelphia, Pa., U.S.A.; Permutit RS of the Permutit A. G., Berlin-Schmargendorf, Berlin; Duolite C–25 of the Chemical Process Company, Redwood City, Calif., U.S.A.; and phenolic resins containing sulfonic acid groups, such as Duolite C–3 of the Chemical Process Company, Redwood City, Calif., U.S.A.; Lewatit PN and KSN of the Farbenfabriken Bayer, Leverkusen, Federal Republic of Germany, and Wofatit F, P and D of the VEB Farbenfabriken Wolfen, Germany. Mixtures of various types of cation exchangers may be used.

The acid cation exchange resins are especially active when they are used in the water-free state. The presence of water decreases the catalytic activity of the resin.

One method of dehydration is drying at elevated temperatures under reduced pressure until a constant weight is obtained. Thus drying at 70° C. up to about 100° C. at a pressure of 5 to 10 mm. Hg will effect dehydration. The resin may also be dehydrated by azeotropic distillation with an organic liquid, such as an aromatic or aliphatic hydrocarbon until no further water is obtained in the distillate. Suitable hydrocarbons are heptane, isooctane, toluene, xylene or mixtures thereof.

Appropriate hydrogenation catalysts usable in accordance with the present invention, as aforesaid, are, for example, palladium, platinum, ruthenium, Raney nickel and Raney copper, which may be deposited in pieces or in finely divided form on catalyst supports such as activated carbon (charcoal), activated aluminum oxide (alumina), kieselguhr and pumice, etc.

The process of the invention as mentioned above can be preformed both in batches and continuously. Specifically, for batch operation, use is expediently made of an appropriate stirring mechanism by which a thorough intermixing of all the reactants can be achieved. Agitating mechanisms which operate according to the so-called "typhoon" principle have proven very appropriate (cf. Ullmann, "Enzyclopädie der technischen Chemie," 2nd ed., vol. VII, 626 ("Taifun"), Verlag Urban & Schwarzenberg, Berlin, 1931).

The suspension or fixed bed process systems both can be utilized advantageously for the continuous method of operation. In the suspension process, the catalyst is kept in a floating state by a suitable agitating mechanism. The acetone is fed in continuously and the reaction product is continuously withdrawn from the reaction mixture. For the performance of the continuous process in the presence of a fixedly disposed catalyst, one may make use, for example, of a vertical reaction tube through which acetone is sprinkled downwardly over the mixture of the two catalysts in the form of a fixed bed catalyst, and through which hydrogen is fed from the bottom to the top in a countercurrent direction to the acetone.

Notably, in the suspension process, the quantity of the cation exchanger amounts to about 5 to 100 parts by weight, preferably about 20 to 50 parts by weight, per 100 parts by weight of liquid acetone passing through it. While the amount of the cation exchanger present should be relatively large, even relatively small amounts of hydrogenation catalyst will suffice, say about 0.01 to 5 parts by weight of metal per 100 parts by weight of acetone.

In the case of the fixedly disposed catalyst, on the other hand, about 0.2 to 40 parts by weight and preferably about 1 to 10 parts by weight of liquid acetone may be passed per hour through the reaction chamber for each part by weight of cation exchanger. The quantity of hydrogenation catalyst in this instance amounts to about 0.0001 to 1 part by weight, preferably about 0.0002 to 0.4 part by weight of metal, for each part by weight of cation exchanger used. When a palladium catalyst is used, 0.0001 to 0.002 part by weight of palladium metal with reference to each part by weight of cation exchanger used has proven sufficient in this connection.

The ratio of moles of hydrogen per mole of acetone may vary from 0.1:1 to 5:1. A preferred ratio is from 0.5:1 to 2.5:1.

Significantly, according to the present invention, the partial pressure of the hydrogen should be kept low to prevent the formation of isopropyl alcohol by the undesired hydrogenation of the acetone. A hydrogen partial pressure of about 1.1 to 25 atm., preferably from about 1.5 to 15 atm., is entirely sufficient for the thorough hydrogenation of C=C double bonds. The inherent pressure of the system, of course, is governed by the particular composition of the reaction mixture and the temperature utilized.

The overall reaction takes place preferably at elevated temperatures as aforesaid. Whereas at 50° C. the speed of reaction is still relatively low, substantially faster conversion rates are achieved in the temperature range of 100 to 200° C. Temperatures ranging from 115 to 150° C. have proven especially suitable. In any case, temperatures between about 50–200° C. are generally usable in accordance with the invention.

On account of the low hydrogen partial pressure used, the total vapor pressure of the system is to a great extent determined by the inherent vapor pressure of the components at the reaction temperature and therefore the same may be controlled as desired. In the 115–140° C. temperature range, for instance, it is accordingly expedient to operate at total pressures of about 3 to 20 atm., and preferably 6–15 atm., for optimum results, although total pressures even higher than 20 atm. are also possible.

Example 1

In a 2-liter autoclave made of Remanit steel with a lifting-action agitator, a mixture of 1 liter of acetone, 500 cc. of Dowex 50W–X8 in the hydrogen ion form, and 20 grams of 10% palladium charcoal, is heated with agitation at a partial pressure of 2.5 atm. hydrogen. At 75° C., the beginning of the absorption of hydrogen is noted, which becomes increasingly rapid as the temperature further increases, and reaches its peak at 130° C. after about 1 hour. Then, while retaining 10 atm. of total pressure and keeping the temperature at 130° C., the mixture is agitated for another 4 hours while constantly adding hydrogen as needed. After cooling, the reaction mixture is filtered free of catalyst. It shows a methyl isobutyl ketone content of 44.9% by weight. Through the column distillation of 722 grams of the filtered reaction mixture, 283 grams of methyl isobutyl ketone are obtained, which pass over in the boiling range of 114–117° C.

In the following comparison experiment, acetone is in the manner as described in Example 1 contacted with an acid cation exchange resin in the absence both of hydrogen and a hydrogenating catalyst, whereby mesityl oxide is formed.

A mixture of 1 liter of acetone and 500 cc. of Dowex 50W–X8 in the hydrogen ion form is heated with agitation to 130° C. After 4 hours, the mixture is cooled and filtered free of catalyst. The filtered reaction product exhibits 6.7% by weight of mesityl oxide, 86.4% by weight of unreacted acetone, 4.2% by weight of water and 5.7% by weight of higher ketones. The rest contains undefinable products. The catalyst used soon becomes deactivated. This comparison example shows the superiority of the joint utilisation of a cation exchanger and a hydrogenation catalyst.

Example 2

In accordance with the procedure described in Example 1, 700 cc. of acetone, 700 cc. of cation exchange resin Dowex 50W–X8 in the hydrogen ion form, and 15 g. of 10% palladium charcoal are heated with agitation to 130° C., and a pressure of 10 atm. is maintained by feeding in hydrogen as required. After 3½ hours of operating time, the experiment is interrupted. The filtered reaction product exhibits a methyl isobutyl ketone content of 57.3% by weight.

Example 3

700 cc. of acetone, 700 cc. of Dowex 50W–X8 cation exchange resin in the hydrogen ion form and 15 grams of 10% weight palladium charcoal are heated in accordance with the procedure described in Example 2, to 145° C., with agitation. The hydrogen pressure is adjusted to the higher inherent vapor pressure of the system so that a total pressure of 16 atm. is produced. After 5 hours of operating time, the hydrogen absorption has become so slow that the experiment is broken off. The filtered reaction product exhibits a methyl isobutyl ketone content of 70.0% by weight.

Example 4

700 cc. of acetone are treated with hydrogen in accordance with the procedure described in Example 1, in the presence of 200 g. of Amberlite IR–112 cation exchange resin the hydrogen ion form previously vacuum dried at 80° C., and of 15 g. of 10% palladium charcoal, at 130° C., with agitation, so that a total pressure of 11.5 atm. is established. After 3½ hours of operating time, the reaction mixture shows a content of 68.9% by weight methyl isobutyl ketone.

Example 5

In the manner described in Example 1, 1000 cc. of acetone, 500 cc. of Lewatit KSN cation exchange resin in the hydrogen ion form, and 20 g. of 2% ruthenium charcoal are heated with agitation to 135° C., and a pressure of 13 atm. is maintained by the feeding in of hydrogen as required. After 3½ hours of operating time, the experiment is discontinued. The filtered reaction product exhibits a 54.6% by weight content of methyl isobutyl ketone.

Example 6

In a 1.2-liter container having a pressure agitating mechanism with an agitating system working according to the "typhoon" principle, steam jacket heating and a built-in filter candle, a mixture of 588 g. of acetone, 232 g. of dried cation exchange resin Duolite C–3 in the hydrogen ion form and 20 g. of 2% palladium charcoal, are heated to 135° C. under a constant hydrogen partial pressure of 2 atm., by means of steam at 2.5 atmospheres excess pressure, and the reaction mixture is agitated for 1 hour without feeding in acetone. Then, the feeding of 392 g. of acetone per hour is begun, while at the same time 392 g. of reaction product per hour are removed through the filter candle. Over a period of 50 hours, a methyl isobutyl ketone content of 27% by weight develops in the mixture that is being drawn off.

Example 7

In a 2-liter Remanit steel autoclave with lifting-action agitation, a mixture of 750 cc. of acetone, 200 g. of dried cation exchange resin Permutite RS in the hydrogen ion form and 50 g. of Raney nickel previously desiccated with acetone, is heated to 130–135° C. with agitation, while maintaining a hydrogen partial pressure of 5 atm. After continuing the agitation for 3½ hours under these reaction conditions, the mixture is allowed to cool under agitation, and a methyl isobutyl ketone content of 55.3% by weight is found in the reaction mixture upon filtering such mixture free of catalyst.

Example 8

The reaction tube used is a vertical stainless steel pressure tube of 5 cm. diameter and 1 m. length and is heated with steam at a pressure of 2.5 atmospheric gage. Up to a level of 92 cm., the tube is filled with 6 mm. tablets obtained by press-molding of a mixture of equal parts by weight of Dowex 50W–X8 and 5% palladium charcoal. The tube contains 1.8 liters of the fixed-bed catalyst as specified with a bulk density of 0.6. The weight of the catalyst is 1.08 kg. In this reaction tube, 1000 cc. of acetone are forced in per hour at the top, and 90 liters of hydrogen are forced in per hour at the bottom. The unreacted part of the hydrogen that passes through the catalyst column is taken off at the top and fed back to the reaction tube with fresh hydrogen by a gas circulation pump. In the reactor, where a temperature of 135° C. is produced as a result of the heating with 2.5 excess atmospheres of steam, a pressure of 15 atmospheres is maintained by proportioning the hydrogen accordingly. In the reaction product drawn off at the bottom, the methyl isobutyl ketone content slowly increases, and then establishes itself at 35 weight percent of methyl isobutyl ketone.

Example 9

In a 2-liter Remanit steel autoclave with lifting-action agitating, a mixture of 750 cc. of acetone, 100 grams of dried cation exchange resin Dowex 50W–X8 in the hydrogen ion form, 100 grams dried cation exchange resin Duolite C–25 in the hydrogen ion form and 50 grams of Raney copper previously desiccated with acetone, is heated to 133–137° C. with agitation, while maintaining a hydrogen partial pressure of 6 atm. After continuing the agitation for 3 hours under these reaction conditions, the mixture is allowed to cool under agitation, and a methyl isobutyl ketone content of 49.8% by weight is found in the reaction mixture upon filtering free of catalyst.

Example 10

In a 1.2-liter container having a pressure agitating mechanism with an agitating system working according to the "typhoon" principle, steam jacket heating and a built-in filter candle, a mixture of 588 grams of acetone, 150 grams of dried cation exchange resin Amberlite IR–112 in the hydrogen ion form, 82 grams of dried cation exchange resin Permutite RS in the hydrogen ion form and 20 grams of 2% platinum charcoal, are heated to 140° C. under a constant hydrogen partial pressure of 2 atm., by means of steam at 2.5 atmospheres excess pressure, and the reaction mixture is agitated for 1 hour without feeding in acetone. Then, the feeding of 392 grams of acetone per hour is begun, while at the same time 392 grams of reaction product per hour are removed through the filter candle. Over a period of 50 hours, a methyl isobutyl ketone content of 26% by weight develops in the mixture that is being drawn off.

What is claimed is:

1. Process for the single-stage production of methyl isobutyl ketone which comprises contacting acetone in liquid phase with hydrogen in the simultaneous presence of a strongly acid cation exchange resin in its acid form and an olefinic double bond selectively hydrogenating catalyst at an elevated temperature between about 50–200° C. and an elevated pressure between about 1–50 atmospheres absolute, and recovering the methyl isobutyl ketone-containing reaction mixture.

2. Process according to claim 1 wherein the methyl isobutyl ketone is recovered from the reaction mixture.

3. Process according to claim 1 wherein the process is carried out batchwise.

4. Process according to claim 1 wherein the process is carried out continuously.

5. Process according to claim 1 wherein the process is carried out in a suspension catalyst system using the cation exchange resin in an amount between about 5–100 parts by weight per 100 parts by weight of acetone present and said hydrogenation catalyst in an amount between about 0.01–5 parts by weight of metal per 100 parts by weight of acetone present.

6. Process according to claim 1 wherein the process is carried out in a fixed bed catalyst system, and 0.2–40 parts by weight of acetone per hour are used per part by weight of cation exchange resin present, said hydrogenation catalyst being present in an amount between about 0.0001 to 1 part by weight of metal per part by weight of cation exchange resin present.

7. Process according to claim 6, wherein 1 to 10 parts by weight of acetone are used per hour per part by weight of cation exchange resin present, said hydrogenation catalyst being present in an amount between 0.0002 to 0.4 part by weight of metal per part by weight of cation exchange present.

8. Process according to claim 7, wherein a palladium catalyst is used as hydrogenation catalyst in an amount between 0.0001 to 0.0002 part by weight of metal per part by weight of cation exchange resin present.

9. Process according to claim 1 wherein the process is carried out at a temperature between about 100–200° C.

10. Process according to claim 9, wherein the process is carried out at a temperature between about 115 to 150° C.

11. Process according to claim 1 wherein the process is carried out at a temperature between about 115 to 140° C. and at an elevated pressure between about 3 to 20 atmospheres absolute.

12. Process according to claim 11 wherein the partial pressure of the hydrogen present ranges between about 1.1–25 atmospheres absolute.

13. Process according to claim 12, wherein said pressure is between about 6–15 atmospheres absolute, with the partial pressure of the hydrogen present ranging between about 1.5 to 15 atmospheres absolute.

14. Process according to claim 1 wherein said hydrogenation catalyst is selected from the group consisting of palladium, platinum, ruthenium, Raney nickel and Raney copper.

15. Process according to claim 14 wherein said catalyst is situated in divided form on a carrier support.

16. Process according to claim 15 wherein said carrier support is selected from the group consisting of activated carbon, activated aluminum oxide, kieselguhr and pumice.

17. Process according to claim 1 wherein said cation exchange resin is used in the water-free state.

18. Process according to claim 1, wherein mixtures of cation exchange resins are used.

19. In the process for the manufacture of methyl isobutyl ketone in a single stage, the improvement which comprises contacting acetone in liquid phase with hydrogen in gaseous phase in the presence of a mixture of a strongly acid cation exchange resin in its acid form with a hydrogenation catalyst for selectively hydrogenating olefinic double bonds which is selected from the group consisting of palladium, platinum, ruthenium, Raney nickel and Raney copper, at a temperature between about 50–200° C. and a total pressure between about 1–50 atmospheres absolute, with the partial pressure of the hydrogen present ranging btween 1.1–25 atmospheres absolute, and recovering the methyl isobutyl ketone formed from the reaction mixture.

20. Improvement according to claim 19 wherein the process is carried out in a suspension catalyst system, said cation exchange resin being present in an amount between about 5–100 parts by weight per 100 parts by weight of liquid acetone present, and said hydrogenation catalyst being present in an amount between about 0.01–5 parts by weight of metal per 100 parts by weight of liquid acetone present.

21. Improvement according to claim 18 wherein the process is carried out in a fixed bed catalyst system, said acetone being added to the reaction mixture in liquid form at a rate between about 0.2–40 parts by weight per hour per part by weight of said cation exchange resin, and said hydrogenation catalyst being present in an amount between about 0.0001–1 part by weight of metal per part by weight of cation exchange resin present.

References Cited

UNITED STATES PATENTS 2,499,172   2/1950   Smith  ---------------- 260—593
2,367,078   1/1945   Weizmann  ---------- 260—593

OTHER REFERENCES

Klein et al.: Ind. Eng. Chem. 48, 1278–1286 (1956).

DANIEL D. HORWITZ, *Primary Examiner.*